May 29, 1956 J. B. MacNEILL ET AL 2,748,226

COMPRESSED-GAS CIRCUIT INTERRUPTER

Filed Feb. 26, 1953 5 Sheets-Sheet 1

WITNESSES:

John E. Healy

W. R. Crout

INVENTORS

John B. MacNeill &

Benjamin P. Baker.

BY

Ralph H Swingle

ATTORNEY

COMPRESSED-GAS CIRCUIT INTERRUPTER

WITNESSES:
Robert C. Baird
W. R. Crout

INVENTORS
John B. MacNeill &
Benjamin P. Baker.
BY
Ralph H. Swingle
ATTORNEY

COMPRESSED-GAS CIRCUIT INTERRUPTER

Filed Feb. 26, 1953 5 Sheets-Sheet 3

WITNESSES:
Robert C. Baird
W. R. Crout

INVENTORS
John B. MacNeill &
Benjamin P. Baker.
BY
Ralph H. Swingle
ATTORNEY

COMPRESSED-GAS CIRCUIT INTERRUPTER

Filed Feb. 26, 1953 5 Sheets-Sheet 4

WITNESSES:
Robert C. Baird
W. R. Crout

INVENTORS
John B. MacNeill &
Benjamin P. Baker.
BY
Ralph H. Swingle
ATTORNEY

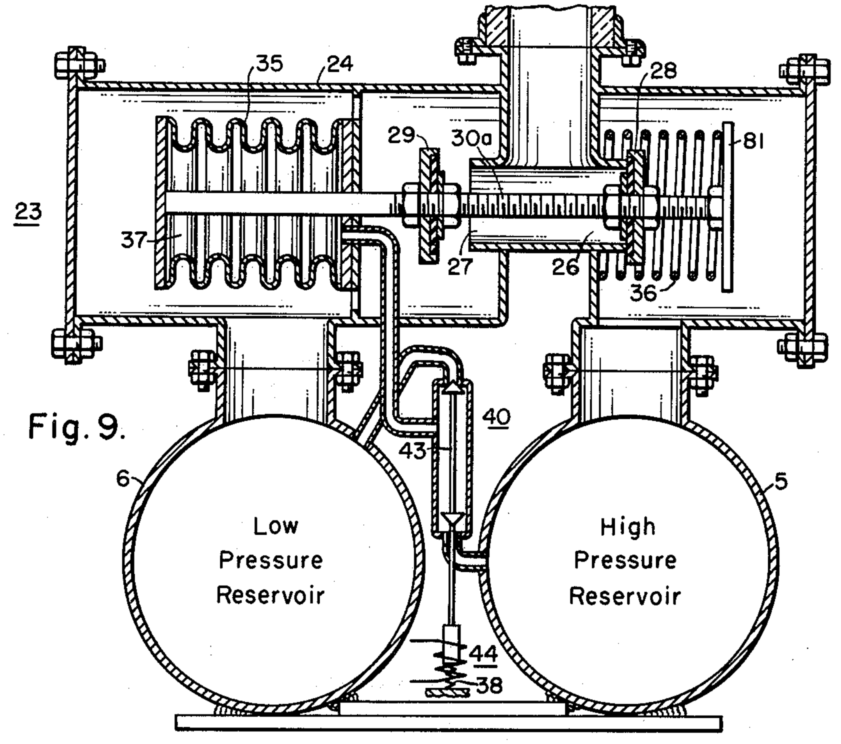
Fig. 7.
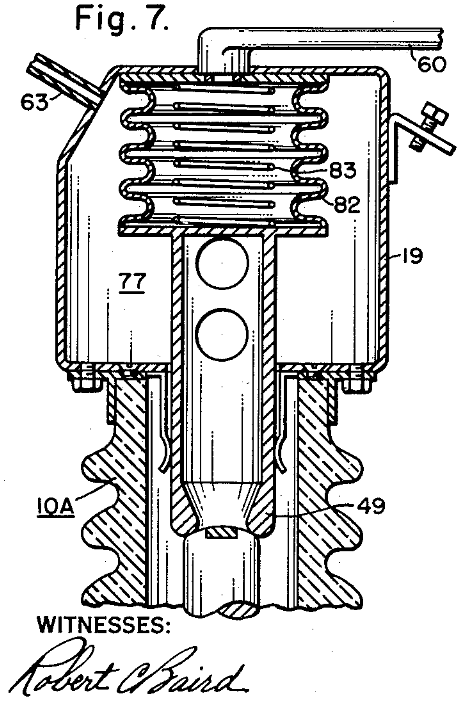
Fig. 8.
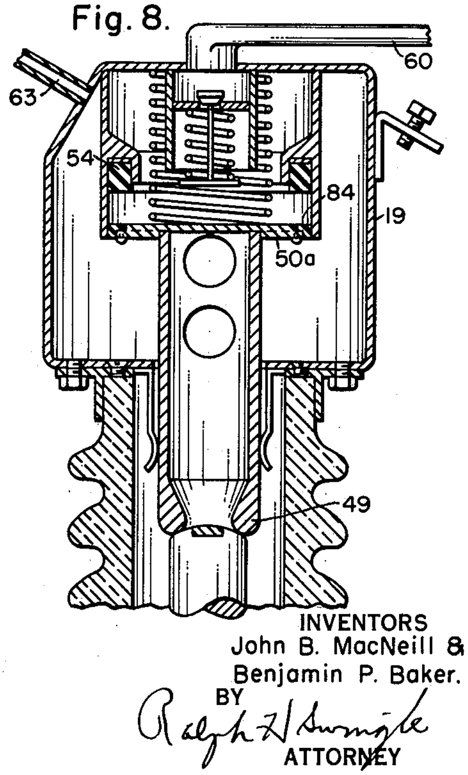
WITNESSES:
Robert C Baird
W. R. Crout
INVENTORS
John B. MacNeill &
Benjamin P. Baker.
BY
Ralph H. Swingle
ATTORNEY 2,748,226

COMPRESSED-GAS CIRCUIT INTERRUPTER

John B. MacNeill, Pittsburgh, and Benjamin P. Baker, Turtle Creek, Pa., assignors to Westinghouse Electric Corporation, East Pittsburgh, Pa., a corporation of Pennsylvania Application February 26, 1953, Serial No. 339,083

25 Claims. (Cl. 200—148)

This invention relates to circuit interrupters in general, and, more particularly, to structural-mounting arrangements and improved arc-extinguishing structures for circuit interrupters of the compressed-gas type.

A general object of our invention is to provide an improved and highly effective circuit interrupter of the compressed-gas type in which arc extinction is obtained in an improved manner.

Another object is to provide an improved compressed-gas circuit interrupter embodying a substantially enclosed system utilizing relatively high and low-pressure storage tanks, whereby the arc-extinguishing fluid may be conserved and repeatedly used during the life of the interrupter.

Another object is to provide an improved circuit interrupter in which internal electrical breakdown from moisture condensation is avoided by utilizing an enclosed system with a dry gas.

Another object is to provide improved means for dividing the voltage across an interrupter of the above type in the open-circuit position thereof.

Another object is to provide an improved structural mounting arrangement for a compressed-gas circuit interrupter.

A further object is to provide an improved blast-valve mechanism for a circuit interrupter of the compressed-gas type.

Still another object is to provide an improved main-contact arrangement for a circuit interrupter of the compressed-gas type.

A further object is to provide an improved switching means for interrupting the residual-current arc of a compressed-gas circuit interrupter of the type using shunting impedances for voltage distribution.

Yet a further object is to provide an improved circuit interrupter in which external demonstration is eliminated by utilizing a substantially enclosed compressed-gas operating system.

Yet another object is to provide an improved compressed-gas circuit interrupter of the repeatable unit type, which is readily adapted for interrupting extremely high voltages by utilizing a plurality of the interrupting units.

Still another object is to provide an improved compressed-gas circuit interrupter which is peculiarly adapted for utilizing a relatively expensive arc-extinguishing gas, such as sulfur hexafluoride ($SF_6$), the use of which as an arc-extinguishing gas of phenomenal interrupting properties is set out and claimed in United States patent application, Serial No. 237,502, filed July 19, 1951, by Harry J. Lingal, Thomas E. Browne, Jr., and Albert P. Strom, entitled "Circuit Interrupters," and assigned to the assignee of the instant application.

Further objects and advantages will readily become apparent upon reading the following specification, taken in conjunction with the drawings, in which:

Fig. 7 is a fragmentary vertical sectional view through a modified type of interrupting unit, similar to that shown in Fig. 6, but indicating an arrangement wherein there occurs no exhausting whatsoever of extinguishing gas to the atmosphere, the contact structure being shown in the closed-circuit position;

Fig. 8 is a view similar to that shown in Fig. 7, but indicating still another modified form of interrupting unit, the contact structure being shown in the closed-circuit position; and Fig. 9 is a fragmentary vertical sectional view through a modified type of blast-valve mechanism, which may be substituted for the blast-valve mechanism illustrated in Fig. 5.

Figure 1:
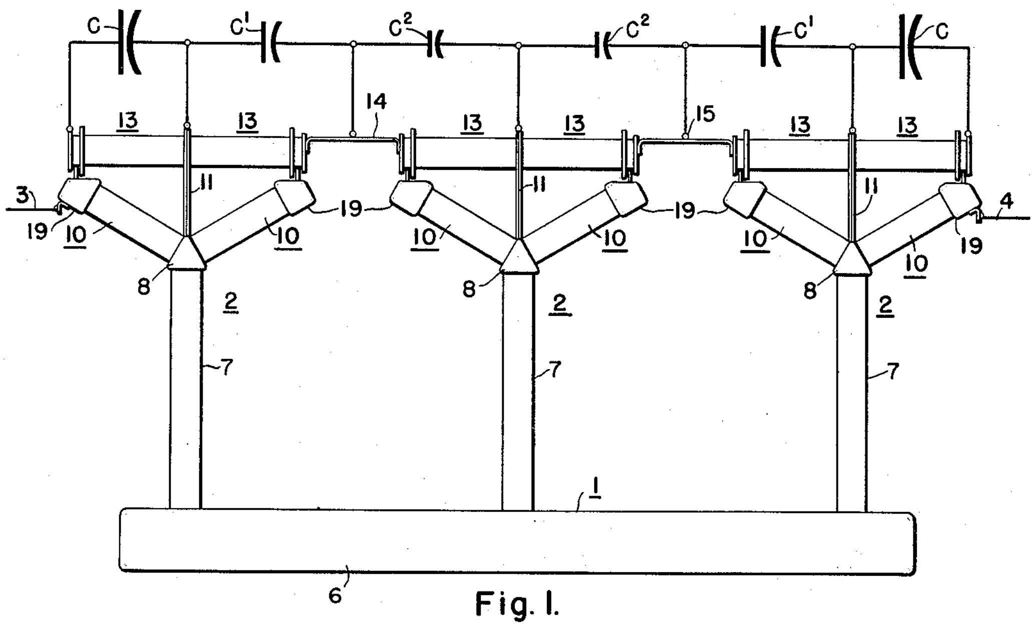
Figure 1 is a side elevational view of a three-phase circuit interrupter embodying the features of our invention.
Figure 2:
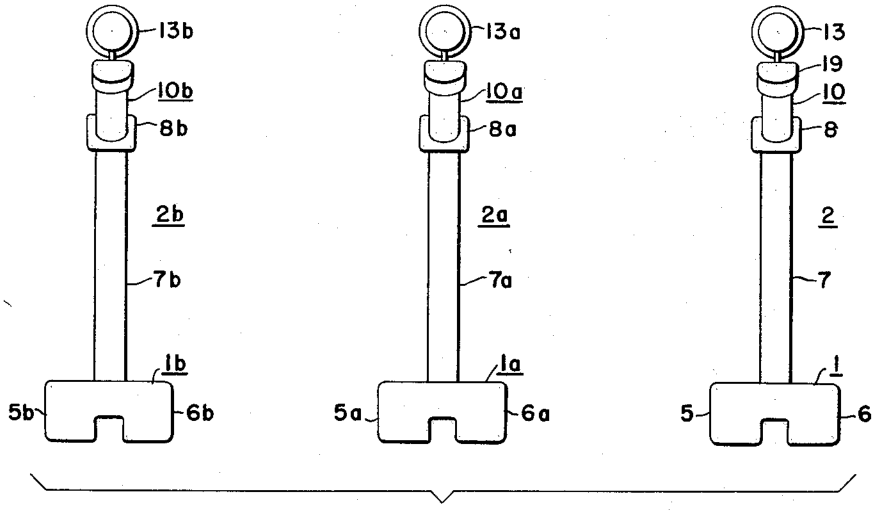
Fig. 2 is an end elevational view of the three-phase circuit interrupter illustrated in Fig. 1.

Referring to the drawings, and more particularly to Figs. 1 and 2 thereof, the reference numeral 1 indicates a base for a plurality of interrupting assemblies, generally designated by the reference numeral 2, and electrically connected in series to interrupt a power line 3, 4. As indicated in Fig. 2, a three-phase system is contemplated, each of the phases being supported on its own base 1, 1*a*, or 1*b* with one or more interrupting assemblies 2, 2*a*, or 2*b*, each assembly consisting of several interrupters connected in series in the manner indicated in Fig. 1.

Preferably, the base 1 forms a housing for a pair of longitudinally-extending storage tanks 5, 6, the former of which encloses relatively high-pressure gas, and the latter of which stores relatively low-pressure gas.

Figure 3:
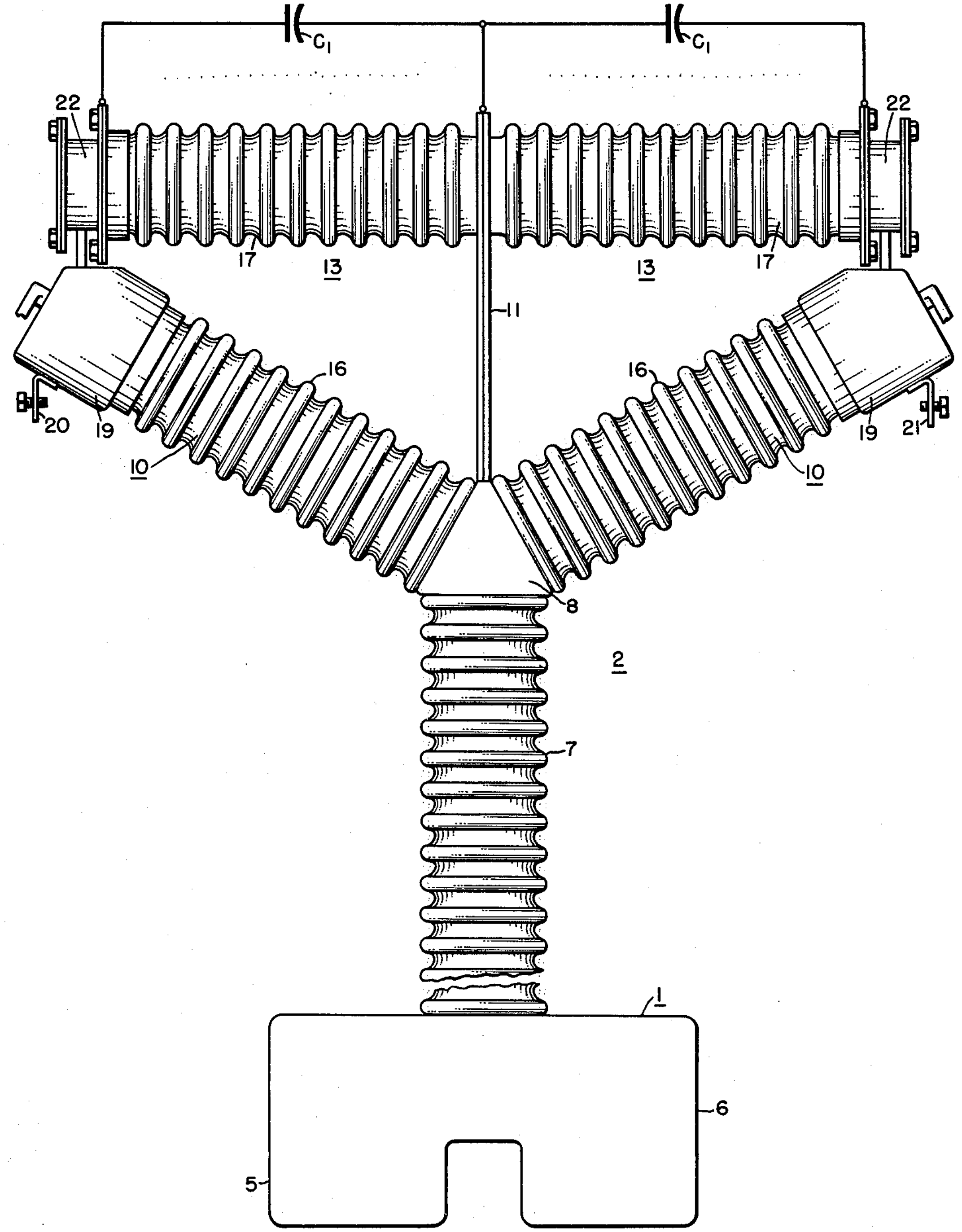
Fig. 3 is an enlarged side elevational view of one of the interrupting assemblies illustrated in Figs. 1 and 2, showing the use of such an assembly in a relatively low-voltage circuit, in which a shorter vertical support column is utilized than in the case of the interrupting assemblies shown in Figs. 1 and 2.

Each interrupting assembly 2 includes a vertically-extending insulator column 7, somewhat diagrammatically indicated in Fig. 1, but more clearly illustrated in Fig. 3. An inspection of the upstanding insulator column 7 of Fig. 3 will indicate it to be of weather-proof construction, and composed of any suitable insulating material of the requisite mechanical strength. Porcelain, or a similar ceramic material, may be used, as well known by those skilled in the art. The insulator column 7 extends upwardly from the base 1 and supports at its upper end a conducting triangularly-shaped support 8, the latter serving to support a pair of diagonally-extending interrupting units 10 in position, as shown.

It will be observed that the interrupting units 10 are electrically connected in series with the line 3, 4 and serve to interrupt the circuit therethrough, as will become more apparent hereinafter. The support member 8 in addition supports an upstanding brace 11, the latter having its upper end disposed between a pair of horizontally-extending impedance columns 13. Conductors 14 and 15 are utilized to connect the terminal ends of the serially-connected interrupting assemblies 2 in the manner indicated in Fig. 1.

Referring more particularly to Fig. 3, in which the base 1 is turned at 90° to indicate the low and high-pressure tanks 6, 5, it will be observed that each interrupting unit 10 comprises a weather-proof casing 16 composed of a suitable weather-proof material of the requisite mechanical strength, such as porcelain or the like. Likewise, the impedance columns 13, or resistor sections, include an outdoor weather-proof casing 17, which may be of a construction similar to that of the casing 16. At the outer ends of the interrupting units 10 are a pair of regurgitation chambers 19 to which the terminals 20, 21 are secured. The regurgitation chambers 19 in turn support contact housings 22 disposed at the outer ends of the impedance columns 13.

It will be observed that the upstanding insulator column 7 of Fig. 3 is shorter than the insulator columns 7 of Figs. 1 and 2. The reason for this is that only a single interrupting assembly 2 is utilized in the construction of Fig. 3 on a relatively lower-voltage circuit than that contemplated in Figs. 1 and 2. Consequently, the line voltage is not so high as in the case of Figs. 1 and 2, and a shorter insulator column 7 may satisfactorily be employed.

Figure 4:
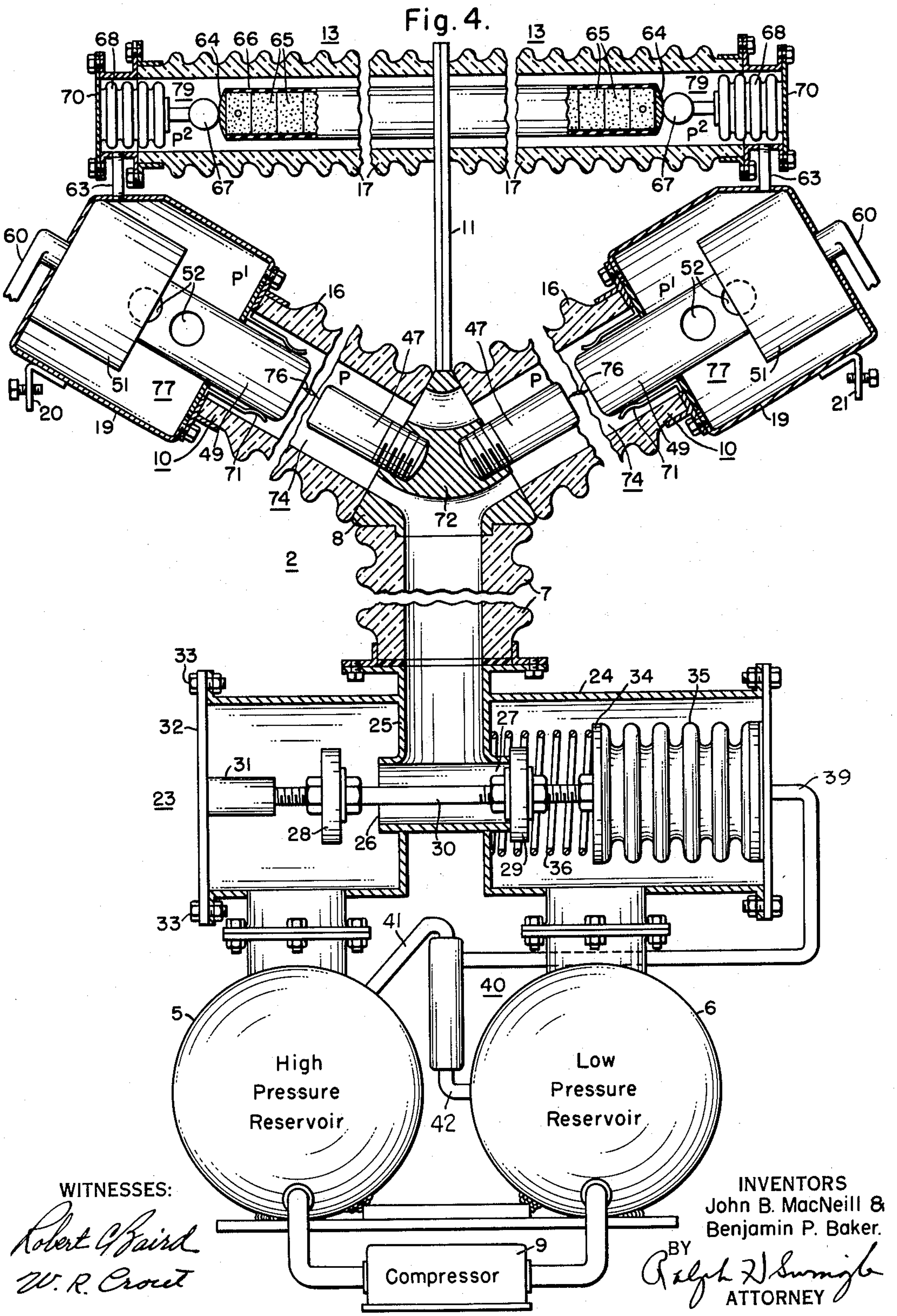
Fig. 4 is a fragmentary vertical sectional view through the interrupting assembly of Fig. 3, the contact structure being shown in the partially open-circuit position.
Figure 5:
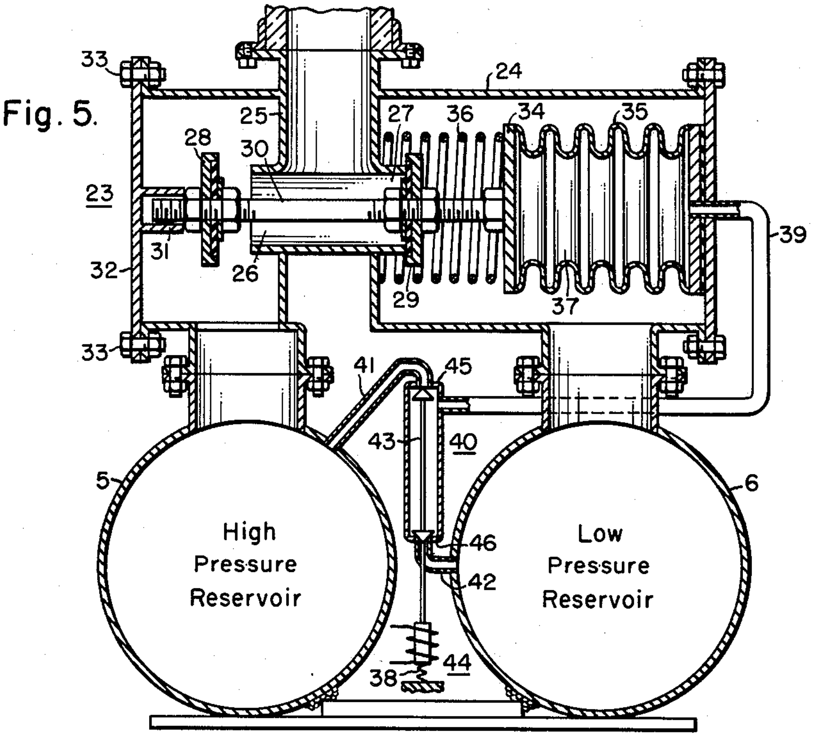
Fig. 5 is a vertical sectional view through the improved blast-valve mechanism shown in Fig. 4, the blast-valve mechanism being shown in the position wherein high-pressure gas is being admitted to the interrupting assembly.
Figure 6:
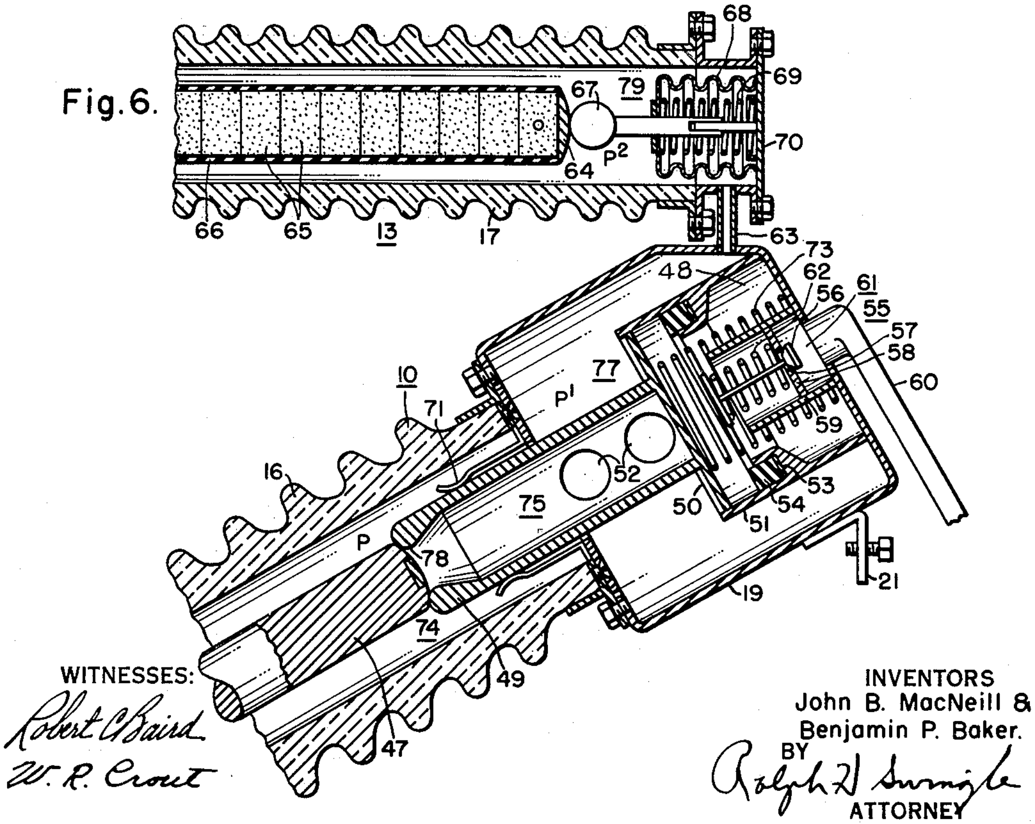
Fig. 6 is an enlarged fragmentary vertical sectional view through one of the interrupting units shown in the interrupting assembly of Fig. 4, the contact structure being illustrated in the closed-circuit position.

Referring more particularly to Figs. 4–6, which more clearly show the internal construction of our improved interrupting assembly 2, and with particular reference being directed to Fig. 4, it will be noted that a three-way blast-valve mechanism 23 is provided at the lower end of the insulator column 7. The blast-valve mechanism includes a valve body 24, interiorly of which is provided a blast-tube extension 25. The blast-tube extension is of T-shape, including a high-pressure inlet opening 26 and a low-pressure inlet opening 27. Pneumatically controlling the inlet openings 26, 27, respectively, is a high-pressure valve 28 and a low-pressure valve 29, arranged for simultaneous opening and closing movements on a valve stem 30. The left-hand end of the valve stem 30 is guided for motion within a guide 31 fixedly secured to a closure plate 32 by bolts 33. The right-hand end of the valve stem 30, as more clearly shown in Fig. 5, is secured to a plate 34 forming the end of a sylphon bellows 35. A compression spring 36 biases the plate 34 toward the right, as shown in Fig. 5, and hence the sylphon bellows 35 toward a collapsed position.

Means are provided to pneumatically connect the interior 37 of the sylphon bellows 35 with either the high-pressure reservoir 5 or the low-pressure storage tank 6. This is accomplished by a conduit 39 which connects with a pilot-valve assembly 40. Pipes 41, 42, respectively, lead from the high and low-pressure tanks 5, 6 to the pilot-valve assembly 40. A pilot valve 43, biased upwardly by a spring 38, is arranged for operation by an electromagnetic actuating means 44, in this instance including an electrically-actuated solenoid.

Thus, deenergization of the solenoid will cause raising of the pilot valve 43 under influence of the spring 38 to close the inlet opening 45 from the high-pressure tank and will cause opening of the inlet opening 46 from the low-pressure tank. This will permit an exhausting of the high-pressure gas from the interior 37 of the sylphon bellows 35 to permit the compression spring 36 to close the high-pressure valve 28 and open the low-pressure valve 27.

Energization of the solenoid 44 will cause the pilot valve 43 to assume the position shown in Fig. 5, wherein the high-pressure gas enters the pipe 41, the inlet opening 45 and through the conduit 39 to the interior 37 of the sylphon bellows 35. The high-pressure gas now present within the sylphon bellows 35 causes a compression of the compression spring 36 to effect closure of the low-pressure valve 27 and opening of the high-pressure valve 28, as shown in Fig. 5.

As shown in Fig. 4, the triangularly-shaped support 8 has a pair of serially-related stationary contacts 47 associated therewith. Each stationary contact 47 cooperates with a tubular movable contact 49, more clearly shown in Fig. 6 of the drawings. The tubular movable contact 49 has a piston plate 50 integrally formed therewith, which moves within an operating cylinder 51. The operating cylinder 51 is fixedly secured by any suitable means, such as welding, to the outer end of the regurgitation chamber 19. The tubular movable contact 49 has apertures 52 provided therein for a purpose more fully explained hereinafter.

The operating cylinder 51 has an annular recess 53 formed therein, within which is positioned a sealing gasket 54. Disposed interiorly of the operating cylinder 51 is a valve mechanism, generally designated by the reference numeral 55, and including a valve 56 which controls a discharge outlet 57 provided in a plate 58. The plate 58 is fixedly secured to a cylindrical support 59, the latter being secured to the outer end of the regurgitation chamber 19. A discharge outlet 60 vents the region 61 on the outlet side of the valve 56. The valve 56 is biased by a spring 62 to its closed position and opens at a predetermined pressure, as will become more apparent hereinafter.

As shown most clearly in Fig. 6, the regurgitation chamber 19 is pneumatically connected by a conduit 63 with the interior of the impedance column 13. As illustrated in Fig. 6, a stationary residual contact 64 is fixedly mounted interiorly within the impedance column 13 at the end of a plurality of impedance or resistance elements 65 enclosed within an insulating tube 66. The impedance elements 65 may be formed of a suitable resistance or impedance compound, such as a mixture of carbon and a binder, or the like. The function, of course, of the impedance column 13 is to shunt the interrupting unit 10 and so control the voltage thereacross during interruption. Also, as well known by those skilled in the art, the impedance elements 65 serve to lower the rate of rise of the recovery voltage transient across the contacts 47, 49 during the opening operation. Reference may be had to United States Patent 2,467,760, by Ludwig, Baker and Leeds for the theory relating to such functions of the resistor column 13.

Cooperating with the stationary residual contact 64 is a movable ball-shaped residual contact 67 secured to the inner end of a sylphon bellows 68, the latter being biased to an extended position to close the contacts 64, 67 by a compression spring 69. The compression spring 69 seats against a closure plate 70 of the impedance column 13, as clearly shown in Fig. 6.

The operation of our improved interrupting assembly 2 will now be explained. In the close-circuit position of the interrupter, as fragmentarily indicated in Fig. 6, movable tubular contacts 49 are in engagement with the stationary contacts 47, and the electrical circuit therethrough includes line terminal 21, conducting chamber 19, spring fingers 71, movable tubular contact 49, stationary contact 47, interconnecting portion 72 of support 8, and through the other interrupting unit 10 in an identical manner to the other line terminal 20. In the closed-circuit position of the interrupter, the high-pressure valve 28 is closed and the low-pressure valve 27 is open, thereby causing the interior of the interrupter to be at the low-pressure of the low-pressure storage tank 6, as will be obvious. Springs 69, 73 maintain the residual contacts 64, 67 and the main contacts 47, 49 closed.

To effect an opening of the interrupter, the solenoid 44 is energized, which will cause downward motion of the pilot valve 43, as shown in Fig. 5. This will permit the high-pressure gas to act through the pipes 41, 39 and into the region 37 of the sylphon bellows 35. This will cause opening of the high-pressure valve 28 and closing of the low-pressure valve 27. High-pressure gas will pass from the reservoir 5 through blast valve 23 and upwardly through the column 7. It will then diverge and pass simultaneously outwardly through both casings 16. The high-pressure gas will then be present at the region 74 within each interrupting unit 10 adjacent the contact structure 47, 49. It will act through small cracks existing between the contacts 47, 49, which always are present, and through the interior 75 of the movable contact 49 and against the piston 50 to effect thereby opening motion of the movable contact 49. The separation between the contacts 47, 49 will establish arcs 76 thereacross, as indicated in Fig. 4, which will be subjected to a strong blast of gas passing through the movable tubular contacts 49 to effect thereby the extinction of the arcs 76. Meanwhile the pressure is building up within the interior 77 of the regurgitation chamber 19. However, this buildup of pressure within the region 77 of the regurgitation chamber 19 will not affect the velocity of the gas flow through the orifice 78 (Fig. 6) of the movable contact 49 until the pressure $P^1$ within the region 77 is over 53% of the pressure P in the region 74 adjacent the contacts 47, 49. Gas flow will occur through the orifice 78 and against the arc 76 at acoustic velocity until the pressure build-up within the region 77 reaches the 53% value. Any further build-up of pressure $P^1$ above this 53% value will, of course, as well known by those skilled in the art, reduce the velocity of the gas flow through the orifice 78.

The dimensions of the orifice 78 and of the regurgitation chamber 19 are such that during the interrupting period, of the order of two cycles, gas flows at acoustic velocity through the orifice 78, thereby bringing about rapid arc extinction. It will be noted that the piston 50, in moving the movable contact 49 to its open position, eventually strikes the gasket 54 and seals the outlet 60. Any pressure rise within the region 48 (Fig. 6) above the value of the low pressure, as determined by the pressure within the tank 6, will cause opening of the valve 56.

Because of the restriction through the conduit 63, the movable residual contact 67 will remain in its closed position during the interrupting operation relative to the contacts 47, 49, as indicated in Fig. 4. In other words, while the arc 76 is being extinguished, the resistance, or impedance, 65 is effective to facilitate such extinction. When the pressure $P^2$ within the region 79 of the casing 17 builds up sufficiently to overcome the biasing action exerted by the compression spring 69 within the sylphon bellows 68, the residual contacts 64, 67 will part, and this gap therebetween will effect extinction of the residual current arc, not shown. Thus in the open-circuit position of the interrupter, the high-pressure valve 28 remains open and high-pressure gas is present throughout the interior of the interrupter. This high-pressure gas will, of course, maintain the springs 73, 69 in a compressed state, and the gasket 54 prevents any discharge of the gas out through the outlet 60.

To reclose the breaker, the solenoid 44 is deenergized, thereby permitting the spring 38 to effect upward movement of the pilot valve 43. This will dump high-pressure gas out of the sylphon bellows 35 and will permit the compression spring 36 to close the high-pressure valve 28, opening the low-pressure valve 27 and rapidly dumping or exhausting the high-pressure gas from the column 7 downwardly through the inlet opening 27 leading to the low-pressure reservoir 6. Thus the high-pressure gas previously present within the interior of the interrupter will be exhausted downwardly through the blast valve 23 and into the low-pressure reservoir. A suitable compressor 9 may be provided to recompress a portion of the gas present in the low-pressure reservoir 6 to maintain the pressure adequate within the high-pressure reservoir 5. Such compressing equipment 9, and the valve control therefor, are well-known to those skilled in the art.

During the exhausting of gas from the interior of the interrupter to the low-pressure reservoir 6, it will be noted that the gas present within the regurgitation chamber 19 will be regurgitated through the orifice 78, thereby minimizing prestriking of the arc between the contacts 47, 49 during the closing operation. Also, high-pressure gas will flow back through the conduit 63 from the region 79 of the impedance column 13 and back through the regurgitation chamber 19 and through the orifice 78 of the movable contact 49 to permit the compression springs 69, 73 to effect closure of the contacts.

It will be noted that due to the spring 36, the high-pressure valve 28 will be closed and the low-pressure valve 27 will be opened when both reservoirs 5, 6 are empty. In this case, the breaker contacts will be in the closed-circuit position. If it is desirable to reverse the valves for the no-pressure position, the high and low-pressure reservoirs 5, 6 can be reversed, as shown in Fig. 9 of the drawings. As shown in Fig. 9, the sylphon bellows 35 is at the opposite side of the valve casing 24, and the spring 36 acts in the same direction as before against a plate 81 secured to the right-hand end of the valve stem 30a. In this case, if both reservoirs 5, 6 are empty, the compression spring 36 will control, and the high-pressure valve 28 will be opened with the low-pressure valve 27 closed.

If it is desirable to eliminate any exhausting of gas through the discharge outlet 60 and to provide a completely-enclosed system, the interrupting unit 10 may be modified in one of two ways. In the way shown in Fig. 7, a sylphon bellows 82 may be employed, so that upon a rise of pressure within the region 77, the spring 83 will be compressed. The operation of the modified unit 10A is the same as that of the unit 10 heretofore described in connection with Fig. 6.

Another way of preventing any exhausting of gas through the outlet 60 would be to provide a peripheral gasket 84 movable with the piston 50a secured to the movable contact 49, as shown in Fig. 8 of the drawings. The other parts of the regurgitation chamber 19 of Fig. 8 are the same as those of the chamber 19 in Fig. 6, the gasket 84 merely preventing any gas passing around the edge of the piston 50a during the time the piston 50a is not in engagement with the gasket 54.

From the foregoing, it will be observed that for a relatively low-voltage application, approximately 100 kv. and below, a single assembly 2, as shown in Fig. 3, may constitute the complete breaker. For higher voltages, several of these assemblies 2 may be grouped, as shown in Fig. 1, with longer insulator columns 7.

This compressed-gas breaker is designed especially for use with special gases, such as sulfur hexafluoride ($SF_6$), where it is neither economical nor desirable to discharge the exhaust gases into the air, as is generally done with compressed-air circuit breakers.

In our improved interrupter, two gas systems are employed, one maintained at high pressure and one at low pressure. During interruption, high-pressure gas is blown through the arc and eventually finds its way into the low-pressure system, from which it is pumped back into the high-pressure system. During the time the breaker is standing in the open-circuit position, it is completely filled with gas at high pressure. During the time it is standing in the closed position, it is completely filled with gas at the low pressure. This is accomplished by the two reservoirs 5, 6 and the three-way blast valve 23. To close the interrupter, the pressure is reduced in the breaker to that of the low-pressure system, which permits the several biasing springs to close the contacts. During the time the breaker is standing closed, it is sealed off from atmospheric conditions except through valve 56, which is set to open at a pressure slightly higher than that of the low-pressure system.

The construction is especially attractive when used with a gas possessing the physical properties of sulfur hexafluoride, although we do not limit our interrupter to the use of such a gas. However, this particular gas is found to be very non-corrosive and therefore a very desirable atmosphere for the internal breaker parts when the breaker is standing in either the open or closed positions. Its dielectric strength and interrupting ability is many times greater than air; therefore the sustained pressure when both open and closed can be much less than if air were used. A much larger value of residual current can be interrupted at the contacts 64, 67 in a still atmosphere of $SF_6$ than in air. Tests indicate that on a single orifice, $SF_6$ will interrupt as much current at 44 kv., 100 p. s. i. as will air at 22 kv. and 250 p. s. i.

It will be noted that with our construction, an improved structural mounting arrangement has been disclosed, with the several elements forming a strong, rigid, triangularly-shaped structure, which has the brace 11 interconnecting the support 8 with the midpoint of the impedance columns 13. Thus it is possible to remove or inspect either impedance column 13 and its associated interrupting unit 10 without destroying the support of the other impedance column 13 and its associated interrupting unit 10.

It may, in some instances, be desirable to maintain the internal space of the interrupter at all times at an elevated pressure with a gas which is clean, dry and non-corrosive and of high-dielectric strength. This avoids the possibility of moisture condensation on internal surfaces with the resultant hazard of electrical breakdown by creepage over insulation. In other words, a gas which is preferable, although not necessary, is $SF_6$ with a pressure greater than that of atmosphere. This will, of course, prevent any air or moisture leaking into the system, since the pressure within the system may at all times be greater than that about the interrupter, namely the atmosphere.

It will be observed that we utilize the insulator column 7 both for conducting the high-pressure gas to the interrupting units 10, and also for conducting the used high-pressure gas away from the interrupters 10. Also with our arrangement, the compressed-gas circuit breaker forms a closed system in which the gas, for example $SF_6$, is not exhausted into the atmosphere but may be used over and over again. It will be noted that we have disclosed a compressed-gas circuit interrupter using a gas, such as $SF_6$, in which its dimensions and its insulating members are adjusted for economical use of an interrupting and insulating medium many times more effective than compressed air. Moreover, we have disclosed a silent, demonstrationless, compressed-gas circuit breaker, using a completely-closed gas system, where the gas is used over and over without loss to the atmosphere when either opening, closing or standing in the open or closed positions.

Using such a gas as $SF_6$, the optimum contact separation for interruption provides adequate open-circuit dielectric strength with pressures that can be safely withstood by the porcelain or structural supports.

Although we have emphasized the desirable qualities of $SF_6$, and have indicated how the disclosed interrupter may advantageously be used with $SF_6$, it is to be clearly understood that our interrupter may be used with any other gas, other than $SF_6$ which, for one purpose or another, it may be desirable to use over and over again.

Preferably we provide means for dividing the voltage equally between the interrupting units 10 after the arcs between the residual contacts 64, 67 have been extinguished. This can be done by suitable impedance means. For example, a shunting capacitance such as C, $C^1$, $C^2$ can be used, as shown in Fig. 1. The capacity shunts may be equal if of a high enough capacitance value, or the capacity shunts C across the end assemblies 2 (which are most highly stressed) may be greater and decrease in capacitance value toward the center. This is indicated diagrammatically in Fig. 1.

Considering the interrupter of Fig. 3, the desired shunting capacitance $C^1$, may be obtained by constructing the weatherproof casings 17 out of a high specific inductive capacity material, such as $TiO_2$. Obviously, such capacitance may be built into a tube by means of foil layers, etc.

It will be customary, of course, as well known by those skilled in the art, to use disconnecting switches (not shown) in series with the line connections 4 (Fig. 1). Such disconnecting switches will be opened when working on the line.

Although we have shown and described specific structures, it is to be clearly understood that the same were merely for the purpose of illustration, and that changes and modifications may readily be made therein by those skilled in the art, without departing from the spirit and scope of the invention.

We claim as our invention:

1. A circuit interrupter of the compressed-gas type including an interrupting assemblage, the interrupting assemblage including a pair of serially-related interrupting units extending outwardly at an angle, a supporting column for supporting the interrupting units, and a pair of end-to-end impedance columns extending in substantially a straight line connected across the outer ends of the interrupting units.

2. A circuit interrupter of the compressed-gas type including an interrupting assemblage, the interrupting assemblage including a pair of serially-related interrupting units extending outwardly at an angle, a single supporting column for supporting the interrupting units, and a pair of serially arranged impedance columns extending in substantially a straight line connected across the outer ends of the interrupting units.

3. A circuit interrupter of the compressed-gas type including an interrupting assemblage, the interrupting assemblage including a pair of serially-related interrupting units extending outwardly at an angle, a supporting column for supporting the interrupting units, a pair of impedance columns connected across the outer ends of the interrupting units, and a brace interconnecting the midpoint of the impedance columns with the supporting column.

4. A circuit interrupter of the compressed-gas type including an interrupting assemblage, the interrupting assemblage including a pair of serially-related interrupting units extending outwardly at an angle, a single supporting column for supporting the interrupting units, a pair of impedance columns connected across the outer ends of the interrupting units, and a brace interconnecting the midpoint of the impedance columns with the supporting column.

5. A circuit interrupter of the compressed-gas type including a triangularly-shaped interrupting assemblage, two of the sides being formed by serially-related interrupting units, and the third remaining side being formed by an impedance column connecting the outer ends of the interrupting units.

6. A circuit interrupter of the compressed-gas type including a triangularly-shaped interrupting assemblage, two of the sides being formed by serially-related interrupting units, the third remaining side being formed by an impedance column connecting the outer ends of the interrupting units, and a supporting column supporting the midpoint of the interrupting units.

7. A circuit interrupter of the compressed-gas type including an arc-extinguishing interrupting unit, means defining a regurgitation chamber, a movable contact movable through one wall of the regurgitation chamber, a piston secured to the inner end of the movable contact, a vented piston chamber, said piston being associated with the piston chamber, means biasing the movable contact to the closed position, means for accumulating high-pressure gas within the regurgitation chamber during the opening operation, and means for causing a reverse flow of the accumulated gas out of the regurgitation chamber back adjacent the movable contact during the closing operation.

8. A circuit interrupter of the compressed-gas type including an arc-extinguishing interrupting unit, means defining a regurgitation chamber, a movable contact movable through one wall of the regurgitation chamber, means biasing the movable contact to the closed position, means for accumulating high-pressure gas within the chamber during substantially the entire opening operation, and means for causing a reverse flow of the accumulated gas out of the chamber back adjacent the movable contact during the closing operation.

9. A circuit interrupter of the compressed-gas type for interrupting relatively high voltage, an interrupting unit including a movable tubular contact and a relatively stationary contact, a shunting impedance unit having a pair of separable residual current interrupting contacts, means defining a chamber, said movable tubular contact movable through one wall of the chamber, means biasing the contacts of both the interrupting unit and the impedance unit to the closed circuit position, the contacts in both units opening in response to a predetermined pressure, means for accumulating high-pressure gas within the chamber during the opening operation, and means for causing a reverse flow of the accumulated gas out of the chamber back through the movable tubular contact during the closing operation.

10. A circuit interrupter of the compressed-gas type including an arc-extinguishing interrupting unit, means defining a regurgitation chamber, a movable tubular contact movable through one wall of the regurgitation chamber, means biasing the movable contact to the closed position, means for accumulating high-pressure gas within the regurgitation chamber during the opening operation, means for regurgitating the accumulated gas out of the regurgitation chamber back through the movable tubular contact during the closing operation, and the movable tubular contact being connected to a sylphon bellows, the interior of which is vented.

11. A circuit interrupter of the compressed-gas type including an arc-extinguishing interrupting unit, means defining a regurgitation chamber, a movable tubular contact movable through one wall of the regurgitation chamber, a piston secured to the inner end of the movable tubular contact, a vented piston chamber, said piston being associated with the piston chamber, means biasing the movable contact to the closed position, means for accumulating high-pressure gas within the regurgitation chamber during the opening operation, means for regurgitating the accumulated gas out of the regurgitation chamber back through the movable tubular contact during the closing operation, and valve means associated with the vented piston chamber and closed upon opening of the movable tubular contact.

12. A circuit interrupter of the compressed-gas type including an interrupting unit, a low-pressure reservoir, a high-pressure reservoir, a three-way blast valve connecting the two reservoirs and the interrupting unit, the blast valve including a valve rod having high and low-pressure valves secured thereto, means biasing the valve rod in one direction to close one of the valves, and means including a sylphon bellows for moving the valve rod in the other direction to close the other valve.

13. A circuit interrupter of the compressed-gas type including an interrupting unit, a low-pressure reservoir, a high-pressure reservoir, a three-way blast valve connecting the two reservoirs and the interrupting unit, the blast valve including a valve rod having high and low-pressure valves secured thereto, means biasing the valve rod in one direction to close one of the valves, means including a sylphon bellows for moving the valve rod in the other direction to close the other valve, the sylphon bellows being disposed in a region of low pressure, and means selectively connecting the interior of the sylphon bellows either to the low or the high-pressure reservoir.

14. A circuit interrupter of the compressed-gas type including an interrupting unit, a single gas-conducting conduit pneumatically connected to said unit, contact structure disposed within the interrupting unit and responsive to the pressure of the gas within the conduit, a three-way blast valve mechanism, a high-pressure gas reservoir connected to the conduit through the three-way blast valve mechanism to effect opening of the contact structure, a low-pressure gas reservoir connected to the conduit through the three-way blast valve mechanism, the pressure of the low-pressure gas reservoir being low enough to ensure contact closure, and means connecting the conduit to the low-pressure gas reservoir when both reservoirs are empty.

15. A circuit interrupter of the compressed-gas type including an interrupting unit, a single gas-conducting conduit pneumatically connected to said unit, contact structure disposed within the interrupting unit and responsive to the pressure of the gas within the conduit, a three-way blast valve mechanism, a high-pressure gas reservoir connected to the conduit through the three-way blast valve mechanism to effect opening of the contact structure, a low-pressure gas reservoir connected to the conduit through the three-way blast valve mechanism, the pressure of the low-pressure gas reservoir being low enough to ensure contact closure, and means connecting the conduit to the high-pressure gas reservoir when both reservoirs are empty.

16. A circuit interrupter of the compressed-gas type including an arc-extinguishing interrupting unit, means defining a regurgitation chamber, a movable tubular contact movable through one wall of the regurgitation chamber, piston means associated with said contact to cause the actuation thereof, means biasing the movable contact to the closed position, means for accumulating high-pressure gas within the regurgitation chamber during substantially the entire opening operation, and means for regurgitating the accumulated gas out of the regurgitation chamber back through the movable tubular contact during the closing operation.

17. A circuit interrupter of the compressed-gas type including an arc-extinguishing interrupting unit, means defining a chamber, a movable tubular contact movable through one wall of the chamber, piston means associated with said contact to cause the actuation thereof, means biasing the movable contact to the closed position, means for accumulating high-pressure gas within the chamber during the opening operation, means for causing a reverse flow of the accumulated gas out of the chamber back through the movable tubular contact during the closing operation, an impedance unit shunting the interrupting unit, a conduit pneumatically connecting the impedance unit with the chamber, and said impedance unit having a pair of separable residual-current interrupting contacts responsive to the pressure within the chamber.

18. A circuit interrupter including a pair of serially related interrupting units, impedance means shunting the units for assisting in circuit interruption, means for breaking the residual current through the impedance means, and additional impedance means across each unit through which current passes for substantially equally dividing the voltage between the units when the interrupter is in the open-circuit position.

19. A circuit interrupter including a pair of serially related interrupting units, impedance means shunting each of the units for assisting in circuit interruption, means for breaking the residual current through the impedance means, and additional impedance means across each unit through which current passes for substantially equally dividing the voltage between the units when the interrupter is in the open-circuit position.

20. A circuit interrupter including a plurality of interrupting assemblies, each assembly including a pair of serially related interrupting units, contact structure associated with each unit separable to establish an arc, impedance means shunting one or more units, the residual current being interrupted near the end of the opening operation, and separate impedance means through which current passes shunting each of the units along the assemblies to divide the voltage substantially equally thereacross following interruption of the residual current and in the open circuit position of the interrupter.

21. A circuit interrupter including a plurality of interrupting assemblies, each assembly including a pair of serially related interrupting units, contact structure associated with each unit separable to establish an arc, impedance means shunting one or more units, the residual current being interrupted near the end of the opening operation, and separate impedance means shunting two or more of the units along the assemblies to divide the voltage substantially equally thereacross following interruption of the residual current and in the open circuit position of the interrupter, the separate impedance means being graded to be less at the ends of the interrupter than in the middle.

22. A circuit interrupter of the compressed-gas type including an arc-extinguishing interrupting unit, means defining a chamber having a passage leading thereinto, contact structure including a pair of relatively movable contacts cooperable to establish an arc, means for accumulating high-pressure gas within the chamber during the entire opening operation, and means for causing a reverse flow of the accumulated gas out of the chamber through the passage and between the contacts during the closing operation.

23. A circuit interrupter of the compressed-gas type including an arc-extinguishing interrupting unit, means defining a regurgitation chamber, a pair of separable contacts at least one of which is movable, means responsive to an increase of pressure within the interrupting unit to effect opening movement of said movable contact, means biasing the movable contact to the closed position, means for accumulating high-pressure gas within the regurgitation chamber during the entire opening operation of the movable contact, and means for causing a reverse flow of the accumulated gas out of the regurgitation chamber back adjacent the movable contact during the closing operation.

24. A circuit interrupter of the compressed-gas type including an arc-extinguishing interrupting unit, means defining a regurgitation chamber, a pair of separable contacts at least one of which is movable, means responsive to an increase of pressure within the interrupting unit to effect opening movement of said movable contact, means for accumulating high-pressure gas within the regurgitation chamber during the entire opening operation of the movable contacts, and means for causing a reverse flow of the accumulated gas out of the regurgitation chamber back adjacent the movable contact during the closing operation.

25. A circuit interrupter of the compressed-gas type including an arc-extinguishing interrupting unit, means defining a regurgitation chamber, a pair of separable contacts at least one of which is movable, means responsive to an increase of pressure within the interrupting unit to effect opening movement of said movable contact, means for accumulating high-pressure gas within the regurgitation chamber during the opening operation of the interrupter, and means causing a reverse flow of the accumulated gas out of the regurgitation chamber back adjacent the movable contact during the entire closing operation.

References Cited in the file of this patent

UNITED STATES PATENTS

| | | |
|---|---|---|
| 1,920,894 | Ruppel | Aug. 1, 1933 |
| 1,959,183 | Uebermuth | May 15, 1934 |
| 2,108,560 | Kesselring | Feb. 15, 1938 |
| 2,340,827 | Thommen | Feb. 1, 1944 |
| 2,453,555 | Thommen | Nov. 9, 1948 |
| 2,454,586 | Amer | Nov. 23, 1948 |
| 2,592,079 | Thommen et al. | Apr. 8, 1952 |
| 2,677,739 | Forwald | May 4, 1954 |